(12) United States Patent
Tsantilis et al.

(10) Patent No.: US 9,009,682 B2
(45) Date of Patent: Apr. 14, 2015

(54) ENHANCED UNIT TEST FRAMEWORK

(75) Inventors: Efstratios Tsantilis, Nussloch (DE); Klaus Steinbach, Heidelberg-Kirchheim (DE)

(73) Assignee: SAP SE, Walldorf (DE)

( * ) Notice: Subject to any disclaimer, the term of this patent is extended or adjusted under 35 U.S.C. 154(b) by 484 days.

(21) Appl. No.: 12/966,122

(22) Filed: Dec. 13, 2010

(65) Prior Publication Data

US 2012/0151455 A1  Jun. 14, 2012

(51) Int. Cl.
*G06F 11/36* (2006.01)

(52) U.S. Cl.
CPC ........ *G06F 11/3688* (2013.01); *G06F 11/3604* (2013.01)

(58) Field of Classification Search
CPC ............ G06F 11/3688; G06F 11/3676; G06F 17/30286; G06F 8/10; G06F 11/3616
USPC .......................................... 717/132, 144, 156
See application file for complete search history.

(56) References Cited

U.S. PATENT DOCUMENTS

| | | | | |
|---|---|---|---|---|
| 4,827,404 A | * | 5/1989 | Barstow et al. | 703/20 |
| 5,651,111 A | * | 7/1997 | McKeeman et al. | 714/38.1 |
| 5,655,074 A | * | 8/1997 | Rauscher | 714/38.1 |
| 5,689,711 A | * | 11/1997 | Bardasz et al. | 717/105 |
| 6,973,646 B1 | * | 12/2005 | Bordawekar et al. | 717/146 |
| 7,050,922 B1 | * | 5/2006 | Zhou | 702/120 |
| 7,526,468 B2 | * | 4/2009 | Vincent et al. | 1/1 |
| 2004/0034848 A1 | * | 2/2004 | Moore et al. | 717/117 |
| 2006/0168480 A1 | * | 7/2006 | Chandler et al. | 714/38 |
| 2007/0294405 A1 | * | 12/2007 | Mohindra et al. | 709/226 |
| 2009/0222697 A1 | * | 9/2009 | Thakkar et al. | 714/38 |
| 2011/0087767 A1 | * | 4/2011 | Sonkin et al. | 709/224 |
| 2011/0145643 A1 | * | 6/2011 | Kumar et al. | 714/33 |
| 2012/0030654 A1 | * | 2/2012 | Park et al. | 717/124 |

OTHER PUBLICATIONS

Harold, Elliotte Rusty; An Early Look at JUnit 4; 13 pages; http://www.ibm.com/developerworks/java/library/j-junit4.html; Dec. 10, 2010

Wikipedia; Unit Testing; 7 pages; http://en.wikipedia.org/wiki/Unit_testing; Dec. 10, 2010.

* cited by examiner

*Primary Examiner* — Chat Do
*Assistant Examiner* — Sergio J Curbelo, III
(74) *Attorney, Agent, or Firm* — Fish & Richardson P.C.

(57) ABSTRACT

Implementations of the present disclosure provide methods including analyzing a plurality of units of a software application to determine a dependency graph defining that at least a first unit depends on a second unit. Each unit includes executable instructions. An execution order is determined for the units based on the dependency graph, wherein the execution order specifies execution of the second unit before the first unit. Unit tests are executed for the units according to the execution order, including executing a unit test of the second unit before the first unit. Executing a unit test for a unit comprises executing the executable instructions of the unit and comparing a resulting value to an expected value.

21 Claims, 10 Drawing Sheets

| Task/Program/Class/Method | Stat | Fatal | Crit... | Tol... | Inf... |
|---|---|---|---|---|---|
| ▽ ▢ TASK_STEINBACHK_20091211_ | △ | 0 | 136 | 0 | 6 |
| ▽ ○ CL_TPDA_ADT_RC_BREAKP | △ | 0 | 50 | 0 | 1 |
| ○ CL_TPDA_ADT_RC_BRE | ▢ | 0 | 0 | 0 | 1 |
| ▷ ✕ LTCL_RESOURCE_BRE | ▢ | 0 | 0 | 0 | 0 |
| ▷ ✕ LTCL_RESOURCE_DESI | ▢ | 0 | 0 | 0 | 0 |
| ▷ ✕ LTCL_RESOURCE_RUN | △ | 0 | 50 | 0 | 0 |
| ▽ ○ CL_TPDA_ADT_SER_DEBUG | △ | 0 | 85 | 0 | 1 |
| ○ CL_TPDA_ADT_SER_DE | ▢ | 0 | 0 | 0 | 1 |
| ▷ ✕ LTCL_DEBUGGEE_HAND | ▢ | 0 | 0 | 0 | 0 |
| ▷ ✕ LTCL_DEBUG_CHILD_V | △ | 0 | 30 | 0 | 0 |
| ▷ ✕ LTCL_DEBUG_LIFECYCL | △ | 0 | 15 | 0 | 0 |
| ▷ ✕ LTCL_DEBUG_LIFECYCL | ▢ | 0 | 0 | 0 | 0 |
| ▽ ✕ LTCL_DEBUG_VARIABLE | △ | 0 | 40 | 0 | 0 |
| ◇ FURTHER | △ | 0 | 5 | 0 | 0 |
| ◇ INITIAL_DATA_REFER | △ | 0 | 5 | 0 | 0 |
| ◇ INITIAL_OBJECT_REF | △ | 0 | 5 | 0 | 0 |
| ◇ NOT_EXISTING | △ | 0 | 5 | 0 | 0 |
| ◇ SEVERAL | △ | 0 | 5 | 0 | 0 |
| ◇ SIMPLE | △ | 0 | 5 | 0 | 0 |
| ◇ STRUCTURAL | △ | 0 | 5 | 0 | 0 |
| ◇ UNASSIGNED_FIELD_ | △ | 0 | 5 | 0 | 0 |
| ▷ ✕ LTCL_DESTINATION_HA | ▢ | 0 | 0 | 0 | 0 |
| ▷ ✕ LTCL_VARIABLE_HANDL | ▢ | 0 | 0 | 0 | 0 |
| ▷ ○ CL_TPDA_ADT_DEBUGGER | ▢ | 0 | 0 | 0 | 1 |
| ▷ ○ CL_TPDA_ADT_TEST_DEBU | ▢ | 0 | 0 | 0 | 1 |
| ▽ ○ CL_TPDA_ADT_TEST_DO_N | △ | 0 | 1 | 0 | 1 |
| ○ CL_TPDA_ADT_TEST_DO | ▢ | 0 | 0 | 0 | 1 |
| ▷ ✕ LTCL_DO_NO_TOUCH | ▢ | 0 | 0 | 0 | 0 |
| ▽ ✕ LTCL_VERIFY_PREREQU | △ | 0 | 1 | 0 | 0 |
| ◇ CL_TPDA_ADT_TEST | △ | 0 | 1 | 0 | 0 |
| ◇ TEST_CLASS_OF_CL | ▢ | 0 | 0 | 0 | 0 |
| ◇ TPDA_ADT_TEST_DO | ▢ | 0 | 0 | 0 | 0 |
| ▷ ○ CL_TPDA_ADT_TEST_DO_N | ▢ | 0 | 0 | 0 | 1 |

| 800 ABAP Unit: Result Display | | | | | |
|---|---|---|---|---|---|
| Message Type | | | | | |
| Task/Program/Class/Method | Stat | Fatal | Crit... | Tol... | Inf... |
| ▽ ▫ TASK_STEINBACHK_20091211_ | ⋮ | 0 | 136 | 0 | 6 |
| ▽ ○ CL_TPDA_ADT_RC_BREAKP | ⋮ | 0 | 50 | 0 | 1 |
| ○ CL_TPDA_ADT_RC_BRE | ☐ | 0 | 0 | 0 | 1 |
| ▷ ✕ LTCL_RESOURCE_BRE | ☐ | 0 | 0 | 0 | 0 |
| ▷ ✕ LTCL_RESOURCE_DESI | ☐ | 0 | 0 | 0 | 0 |
| ▷ ✕ LTCL_RESOURCE_RUN | ⋮ | 0 | 50 | 0 | 0 |
| ▽ ○ CL_TPDA_ADT_SER_DEBUG | ⋮ | 0 | 85 | 0 | 1 |
| ○ CL_TPDA_ADT_SER_DE | ☐ | 0 | 0 | 0 | 1 |
| ▷ ✕ LTCL_DEBUGGEE_HAND | ☐ | 0 | 0 | 0 | 0 |
| ▷ ✕ LTCL_DEBUG_CHILD_V | ⋮ | 0 | 30 | 0 | 0 |
| ▷ ✕ LTCL_DEBUG_LIFECYCL | ⋮ | 0 | 15 | 0 | 0 |
| ▷ ✕ LTCL_DEBUG_LIFECYCL | ☐ | 0 | 0 | 0 | 0 |
| ▽ ✕ LTCL_DEBUG_VARIABLE | ⋮ | 0 | 40 | 0 | 0 |
| ◇ FURTHER | ⋮ | 0 | 5 | 0 | 0 |
| ◇ INITIAL_DATA_REFER | ⋮ | 0 | 5 | 0 | 0 |
| ◇ INITIAL_OBJECT_REF | ⋮ | 0 | 5 | 0 | 0 |
| ◇ NOT_EXISTING | ⋮ | 0 | 5 | 0 | 0 |
| ◇ SEVERAL | ⋮ | 0 | 5 | 0 | 0 |
| ◇ SIMPLE | ⋮ | 0 | 5 | 0 | 0 |
| ◇ STRUCTURAL | ⋮ | 0 | 5 | 0 | 0 |
| ◇ UNASSIGNED_FIELD_ | ⋮ | 0 | 5 | 0 | 0 |
| ▷ ✕ LTCL_DESTINATION_HA | ☐ | 0 | 0 | 0 | 0 |
| ▷ ✕ LTCL_VARIABLE_HANDL | ☐ | 0 | 0 | 0 | 0 |
| ▷ ○ CL_TPDA_ADT_DEBUGGER | ☐ | 0 | 0 | 0 | 1 |
| ▷ ○ CL_TPDA_ADT_TEST_DEBU | ☐ | 0 | 0 | 0 | 1 |
| ▽ ○ CL_TPDA_ADT_TEST_DO_N | △ | 0 | 1 | 0 | 1 |
| ○ CL_TPDA_ADT_TEST_DO | ☐ | 0 | 0 | 0 | 1 |
| ▷ ✕ LTCL_DO_NO_TOUCH | ☐ | 0 | 0 | 0 | 0 |
| ▽ ✕ LTCL_VERIFY_PREREQU | △ | 0 | 1 | 0 | 0 |
| ◇ CL_TPDA_ADT_TEST | △ | 0 | 1 | 0 | 0 |
| ◇ TEST_CLASS_OF_CL | ☐ | 0 | 0 | 0 | 0 |
| ◇ TPDA_ADT_TEST_DO | ☐ | 0 | 0 | 0 | 0 |
| ▷ ○ CL_TPDA_ADT_TEST_DO_N | ☐ | 0 | 0 | 0 | 1 |

TO FIG. 8B

ENHANCED UNIT TEST FRAMEWORK

BACKGROUND

Software developers improve the quality and robustness of software using unit testing. In general, unit testing refers to separately testing parts (units) of a whole software application. A unit may be, for example, a method, a class including several methods, or a package or program including many methods. When a unit refers to or depends on another unit, various techniques can be used to separately test the units, for example, mocking, stubbing, and using test doubles.

In practice, it is often not useful or possible to test a unit completely independently from another unit. For example, some units provide basic functionality that is widely used within an application. A failure of such a unit may cause widespread failure of other units that depend on that unit. In another example, collisions (e.g., simultaneous access of a database element) may occur if unit tests are executed in parallel threads, resulting in indeterministic failures during execution of the unit tests. In a further example, client-server applications integration tests that use unit testing typically fail when the server is not available. The integration tests then also fail.

SUMMARY

Implementations of the present disclosure provide computer-implemented methods for improved unit testing. In some implementations, a method includes analyzing a plurality of units of a software application to determine a dependency graph defining that at least a first unit depends on a second unit, each unit comprising one or more executable instructions; determining an execution order for the units based on the dependency graph, wherein the execution order specifies execution of the second unit before the first unit; and executing unit tests for the units according to the execution order, including executing a unit test of the second unit before the first unit, wherein executing a unit test for a unit comprises executing the executable instructions of the unit and comparing a resulting value to an expected value.

In some implementations, analyzing the units to determine the dependency graph includes parsing source code for the first unit to find an annotation specifying that the first unit depends on the second unit.

In some implementations, the annotation specifies a weak dependency or a strong dependency.

In some implementations, analyzing the units comprises determining that a third unit and a fourth unit should not be tested in parallel, and wherein the execution order specifies that the third unit and the fourth unit should not be tested in parallel.

In some implementations, analyzing the units comprises parsing source code for the third or fourth unit to find another annotation specifying that the third unit and the fourth unit should not be tested in parallel.

In some implementations, analyzing the units comprises parsing source code for a third unit to find another annotation specifying that the third unit is incomplete, and wherein executing unit tests for the units comprises not executing a unit test for the third unit.

In some implementations, executing unit tests comprises determining a unit testing error for a third unit and determining, using the dependency graph, not to execute unit tests for any units depending on the third unit.

In some implementations, executing unit tests comprises determining a unit testing error for a third unit and determining, using the dependency graph, not to execute unit tests for any units depending strongly on the third unit.

In some implementations, the method includes displaying a visual representation of the dependency graph.

In some implementations, the method includes receiving user input to modify the dependency graph; modifying the dependency graph according to the user input, resulting in a modified dependency graph; and writing an annotation to source code according to the modified dependency graph.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes at least a server including one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

Various implementations of the subject matter described in this specification can be implemented to realize one or more of the following advantages. An application developer can identify errors resulting from dependencies among units. Application developers can more easily interpret the results of unit testing, for example, where the developers are new to a development project. Unit testing can be executed faster by avoiding unit tests for some units, e.g., units dependent on other units that have errors, or units having prerequisites that are not met. Confusing test results can be avoided for some units by avoiding unit testing for those units in parallel with other units.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 7A-B show a screen-shot that illustrates an example GUI for displaying results of unit testing.

FIGS. 8A-B show a screen-shot that illustrates an example GUI for displaying results of unit testing.

DETAILED DESCRIPTION

Implementations of the present disclosure are generally directed to improved unit testing. Unit testing is performed in an order according to dependencies of the units, e.g., dependencies defined by annotations in source code for the units. Certain units can be specified to avoid parallel execution of those units during unit testing. A unit testing system checks system prerequisites for the execution of unit tests prior to executing those unit tests. Certain units can be tagged as incomplete so that units depending on those units can be tested despite those units being incomplete.

Figure 1:
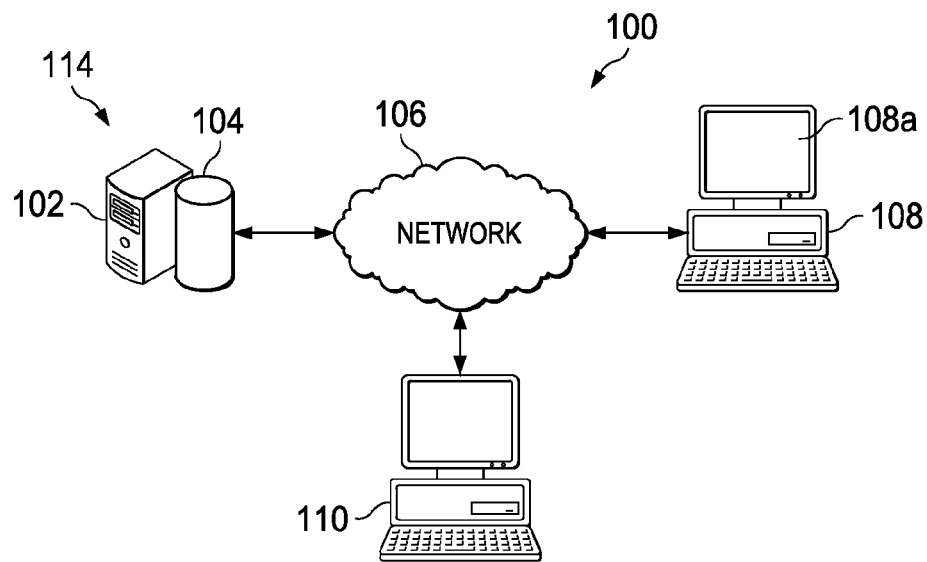
FIG. 1 is a block diagram of an example system that includes a plurality of clients and a computer system.

FIG. 1 is a block diagram of an example system 100 that includes a plurality of clients 108, 110, and a computer system 114. The computer system 114 can include a server 102 and a database 104. In some implementations, the system 100 may represent a client/server system supporting multiple computer systems (e.g., computer system 114) including one or more clients (e.g., clients 108, 110) and/or one or more servers (e.g., server 102) that are connectively coupled for communication with one another over a network 106. In some implementations, the clients (e.g., clients 108, 110) may be directly connected to the one or more servers (e.g., server 102) (without connecting by way of network 106).

The clients 108, 110 can represent various forms of processing devices including, but not limited to, a desktop computer (e.g., 108a), a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. Each client 108, 110 may access application software on the server 102.

The server 102 can represent various forms of servers including, but not limited to a web server, an application server, a proxy server, a network server, or a server farm. For example, the server 102 can be an application server that executes software accessed by clients 108, 110. In operation, multiple clients (e.g., clients 108, 110) can communicate with the server 102 by way of network 106. In some implementations, a user can invoke applications available on the server 102 in a web browser running on a client (e.g., clients 108, 110). Each application can individually access data from one or more repository resources (e.g., database 104). For example, the server 102 can access database 104.

In some implementations, the client devices 108, 110 may communicate wirelessly through a communication interface (not shown), which may include digital signal processing circuitry where necessary. The communication interface may provide for communications under various modes or protocols, such as GSM voice calls, SMS, EMS, or MMS messaging, CDMA, TDMA, PDC, WCDMA, CDMA2000, or GPRS, among others. For example, the communication may occur through a radio-frequency transceiver (not shown). In addition, short-range communication may occur, such as using a Bluetooth, WiFi, or other such transceiver.

In some implementations, the system 100 can be a distributed client/server system that spans one or more networks such as network 106. The network 106 can be a large computer network, such as a local area network (LAN), wide area network (WAN), the Internet, a cellular network, or a combination thereof connecting any number of mobile clients, fixed clients, and servers. In some implementations, each client (e.g., clients 108, 110) can communicate with the server 102 via a virtual private network (VPN), Secure Shell (SSH) tunnel, or other secure network connection. In some implementations, the network 106 can include the Internet, a wireless service network and may include the Public Switched Telephone Network (PSTN). In other implementations, the network 106 may include a corporate network (e.g., an intranet) and one or more wireless access points.

Each client (e.g., clients 108, 110) can establish its own session with the server 102. Each session can be semi-permanent as it can be established at one point in time and torn down at another. Each session can involve two-way information exchange between the computer system 114 and each individual client 108, 110. For example, a Hypertext Transfer Protocol (HTTP) session enables the association of information with individual users. A session can be stateful where at least one of the communicating parts (e.g., the server 102 or the client (e.g., clients 108, 110)) can save information about the session history in order to be able to communicate. Alternatively, stateless communication includes independent requests with associated responses.

Multiple clients (e.g., clients 108, 110) can communicate via network 106 with the server 102, to test an application.

Figure 2:
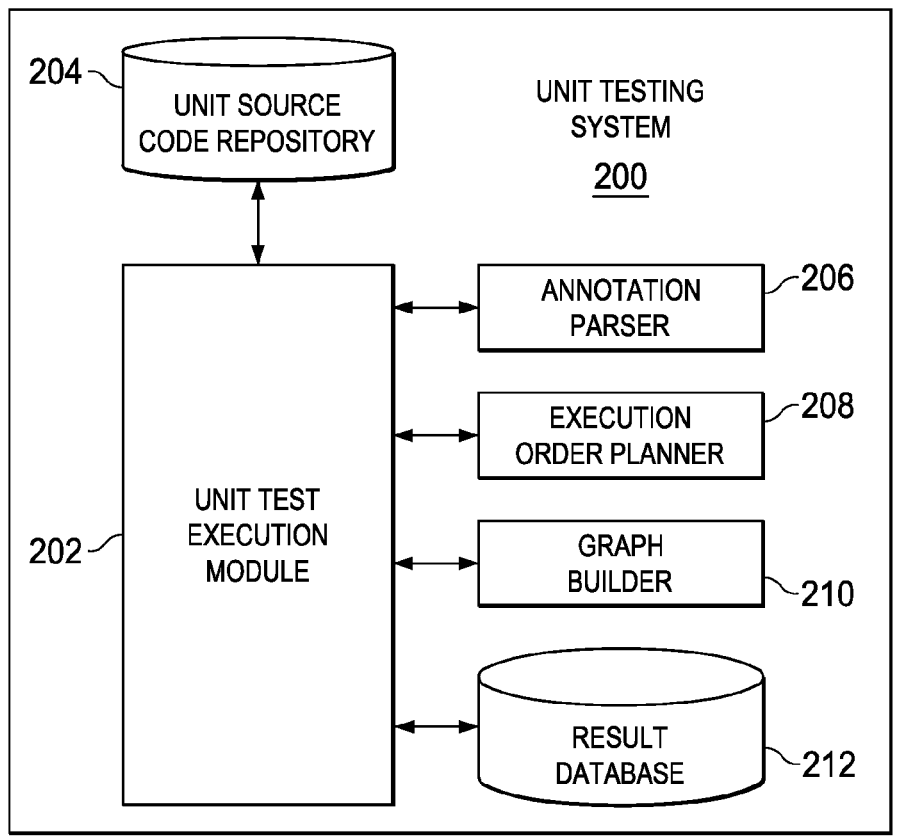
FIG. 2 is a block diagram of a unit testing system of one or more computers configured to test an application by executing unit tests of units of executable instructions.

FIG. 2 is a block diagram of a unit testing system 200 of one or more computers configured to test an application by executing unit tests of units of executable instructions. Taken together, the units comprise the application. The system 200 includes modules 202, 206, 208, and 210 of executable instructions. For purposes of illustration, the modules are described as performing actions that one or more computers of the system perform when executing instructions of the modules.

The unit source code repository 204 stores source code for the units. The system 200 may compile the source code into executable instructions and store those instructions in a repository (e.g., as object files) for execution by a unit test execution module 202. Alternatively, the system 200 may interpret unit source code. For example, the unit test execution module 202 may interpret the source code while executing unit tests.

The unit test execution module 202 executes unit tests by executing units. The unit test execution module 202 determines whether the execution of a unit proceeded as expected or whether errors occurred. For example, the unit test execution module 202 may execute a unit by passing certain parameter values to the unit and then comparing a resulting value to an expected resulting value. Expected resulting values can be stored in a resulting values repository, e.g., populated by developers of the units. The unit test execution module 202 determines that an error occurred when the resulting value does not match the expected resulting value. The unit test execution module 202 may also determine that an error occurred, for example, when a unit throws an exception, unexpectedly stops executing, causes a memory leak, and so on.

The annotation parser 206 parses a unit's source code for annotations specifying parameters for the unit test execution module 202. In general, the annotations are inserted into the source code by developers of the units.

An annotation may specify that a unit depends on one or more system prerequisites. System prerequisites may be, for example, that certain files are available for reading or writing, that a network connection is available, that a client or server is available for communication, and so on. A unit's source code can include an annotation specifying that the unit test execution module 202 should not execute the unit unless a system prerequisite is met.

An annotation may specify that the unit test execution module 202 should not execute a unit in parallel with another unit during unit testing. For example, annotations may be inserted into the source code of units that access a common database. The annotations specify that those units should not be unit tested in parallel because of the potential for collisions in accessing the database.

An annotation may specify that a unit depends on one or more system prerequisites. System prerequisites may be, for example, that certain files are available for reading or writing, that a network connection is available, that a client or server is available for communication, and so on. A unit's source code can include an annotation specifying that the unit test execution module 202 should not execute the unit unless a system prerequisite is met.

An annotation may specify that a unit is incomplete. For example, an incomplete annotation may be inserted into the source of a unit that is complete as to certain functionality but incomplete for other functionality. The unit can still be tested but marked as incomplete.

A graph builder 210 uses the annotations from the annotation parser 206 to build a dependency graph. The dependency graph is a data structure that specifies which units are dependent (and optionally, strongly or weakly dependent) on which other units. The dependency graph is a directed graph, where the direction of an edge between two nodes representing units indicates which unit is dependent on the other. The graph builder 210 builds the dependency graph by creating, for each unit, an edge between a node for the unit and nodes for any units dependent on the unit.

An execution order planner 208 uses the dependency graph of the graph builder 210 to determine an execution order for unit tests of the units. The execution order defines an order in which units are tested. The execution order may specify which units can be tested in parallel (e.g., based on annotations identified by the annotation parser 206). In general, the execution order planner 208 defines the execution order by placing dependent units later in the order. For example, consider a first unit that depends on a second unit. The execution order planner 208 may define the execution order so that the second unit is tested before the first unit. If the second unit test results in an error, the unit test execution module 202 may not execute the test for the first unit.

The unit test execution module 202 executes unit tests in the order defined by the execution order of the execution order planner 208. The unit test execution module 202 optionally executes the unit tests in different test modes. The unit test execution module 202 determines which test mode to use, for example, by reading test mode parameters from a file or by receiving test mode parameters from a user via a graphical user interface. In one example test mode, the unit test execution module 202 executes unit tests for all dependent units. In another example test mode, the unit test execution module 202 executes unit tests for all units having other units that depend strongly (e.g., as specified by annotations) on those units. In a further example test mode, the unit test execution module 202 only executes unit tests of specified units. The units may be specified by parameters, for example, by name or by dependency.

The unit test execution module 202 optionally determines not to execute some units when those units depend on units having errors during their unit tests. The unit test execution module 202 determines how to handle such errors, for example, according to test mode parameters. For example, suppose a first unit depends on a second unit. If the second unit fails, the unit test execution module 202 may determine to log the resulting failure and continue to execute a unit test for the first unit. The unit test execution module 202 may alternatively stop execution of the unit test for the first unit because the first unit depends on the second unit. In implementations where dependency annotations specify a strength of dependency, the unit test execution module 202 may stop execution of the unit test for the first unit if the first unit depends strongly on the second unit.

In some implementations, the unit testing system 200 determines whether system prerequisites are met before executing unit tests. For example, the system 200 may compile all of the prerequisites specified by annotations identified by the annotation parser 206 and only perform unit testing when the specified prerequisites are met. Alternatively, the system 200 may execute unit tests for units having prerequisites that are met and stop unit tests for units having prerequisites that are not met.

Test mode parameters may specify other behavior for the unit test execution module 202. For example, test mode parameters may specify that the unit test execution module 202 consider only internal dependencies, excluding cross-component dependencies. A software component may include subcomponents, e.g., a subunit that serves as a tool within a component. If such a subunit is used in different places within the component, then that component is internally dependent on the subunit.

The result database 212 stores unit test results from the unit testing performed by the unit test execution module 202. The test results include, for example, resulting values, whether a resulting value matched an expected resulting value, whether a unit threw an exception during execution, and so on. The unit test execution module 202 may check the result database 212 prior to executing a unit test for a unit to determine whether results for that unit test are already available. For example, consider a first unit that depends on a second unit. To execute the unit test for the first unit, the unit test execution module 202 may retrieve the results of unit testing the second unit from the result database 212.

Figure 3:
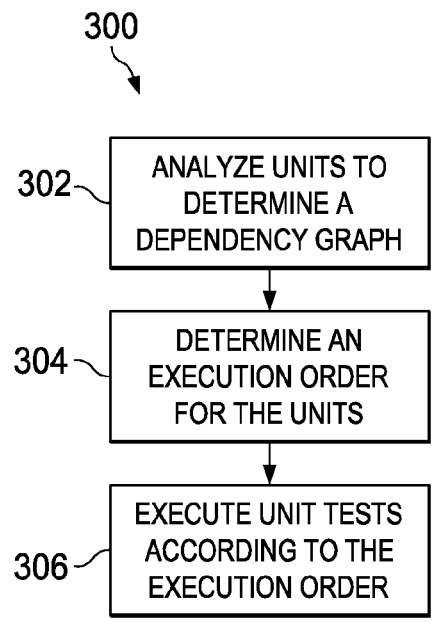
FIG. 3 is a flow diagram of an example process for executing unit tests for a plurality of units.

FIG. 3 is a flow diagram of an example process 300 for executing unit tests for a plurality of units. In some implementations, the process 300 is performed by a system of one or more computers, e.g., the unit testing system 200 of FIG. 2. For purposes of illustration, the process 300 will be described with respect to a system that performs the process 300.

The system analyzes the units to determine a dependency graph (step 302). For example, the system may parse source code for the units (e.g., using the annotation parser 206 of FIG. 2) for annotations and build the dependency graph based on the annotations (e.g., using the graph builder 210 of FIG. 2).

The system determines an execution order for the units (step 304). For example, the system may determine an execution order that specifies that each unit's dependent units are to be executed before that unit (e.g., using the execution order planner 208 of FIG. 2).

The system executes unit tests for the units according to the execution order (step 306). For example, the system may execute the unit tests using the unit test execution module 202 of FIG. 2. The system optionally receives test mode parameters for executing the unit tests. The system optionally stores unit test results in a result database (e.g., result database 212). The system may check the result database for unit test results prior to executing unit tests for some units.

Figure 4:
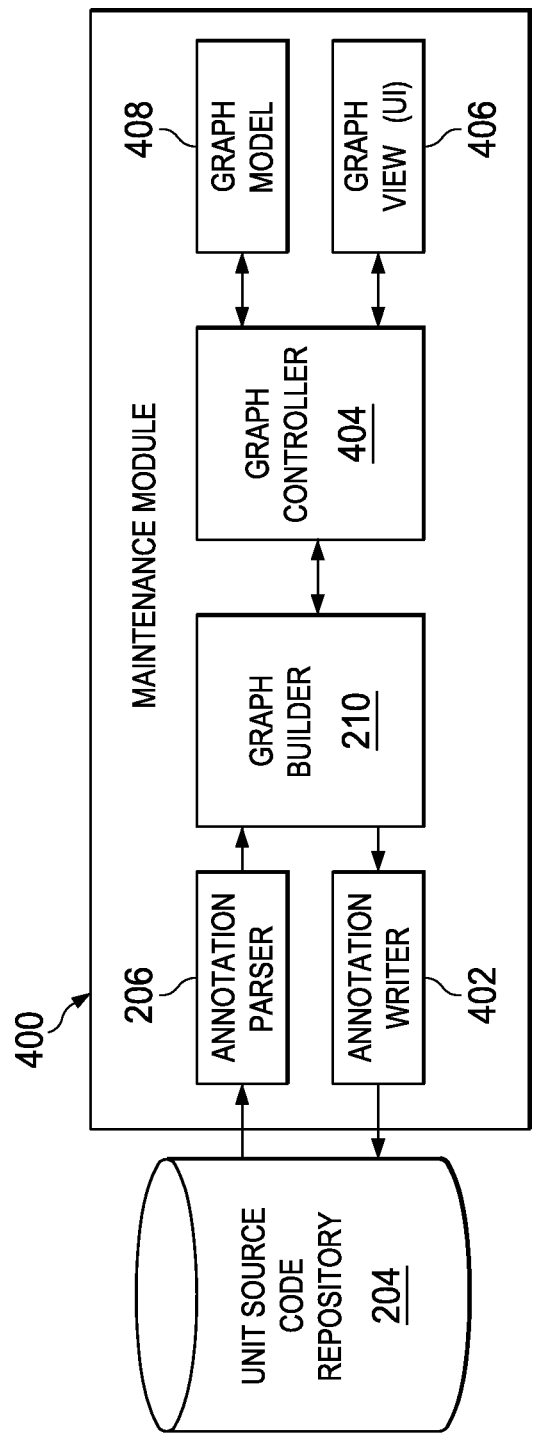
FIG. 4 is a block diagram of a maintenance module configured to maintain annotations in the source code of units of an application.

FIG. 4 is a block diagram of a maintenance module 400 configured to maintain annotations in the source code of units of an application. For purposes of illustration, the module 400 is described as performing actions that one or more computers perform when executing instructions of the module 400.

The maintenance module 400 includes an annotation parser 206 that parses unit source code from a unit source code repository 204, as described above with respect to FIG. 2. The module 400 also includes a graph builder 210 that builds a dependency graph using annotations from the annotation parser 206, as described above with respect to FIG. 2.

The maintenance module 400 includes modules 404, 406, and 408 that a developer can use to edit the dependency graph. Those modules implement the standard model view controller (MVC) concept for displaying and editing the dependency graph. A graph controller 404 implements the controller aspect of the MVC concept by receiving input and providing values to be added or changed in the dependency graph. A graph viewer 406 implements the view aspect of the MVC concept by rendering a visual representation of the dependency graph, e.g., in a user interface. The graph viewer 406 can present the graph or portions of the graph using various techniques for presenting graphs and directed graphs. The graph model 408 implements the model aspect of the MVC concept by managing the directed graph. For example, the graph model 408 may receive and handle instructions from the graph controller 404 to change value of the dependency graph, and the graph model 408 may receive and handle requests from the graph viewer 406 for values of the dependency graph.

An annotation writer 402 writes annotations from the dependency graph into source code for units represented by nodes in the graph. Thus, a developer can view and make changes to the dependency graph using a user interface and propagate those changes back to the source code using annotations. The developer does not have to directly edit the source code for each unit being changed because the annotation writer 402 can write annotations into the source code from the dependency graph. A developer can also use the maintenance module to view the dependency graph and look for units where dependencies may be too intensive or chaotically spread.

Figure 5:
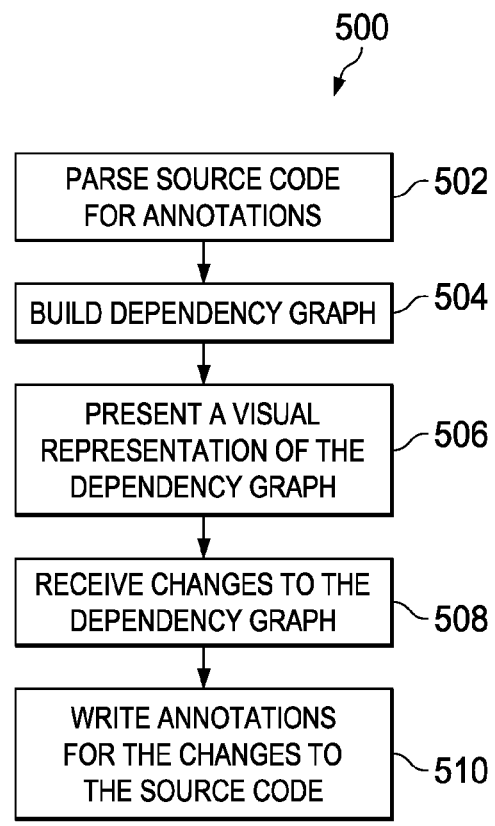
FIG. 5 is a flow diagram of an example process for maintaining annotations in the source code of units of a software application.

FIG. 5 is a flow diagram of an example process 500 for maintaining annotations in the source code of units of a software application. In some implementations, the process 500 is performed by a system of one or more computers, e.g., the unit testing system 200 of FIG. 2 executing the maintenance module 400 of FIG. 4. For purposes of illustration, the process 500 will be described with respect to a system that performs the process 500.

The system parses source code for the units for annotations (step 502). For example, the system may use the annotation parser 206 described above with respect to FIG. 2. The system builds a dependency graph (step 504). For example, the system may use the graph builder 210 described above with respect to FIG. 2.

The system presents a visual representation of the dependency graph (step 506). For example, the system may use the graph viewer 406 described above with respect to FIG. 4. The visual representation may depict nodes as shapes (e.g., circles) and edges as lines between shapes (or arrows to show directionality).

The system receives changes to the dependency graph (step 508). For example, the system may receive user input indicating that a first unit is dependent on a second unit, e.g., user input from a graphical user interface. The system can receive various changes to the dependency graph creating and removing dependencies.

The system writes annotations for the changes to the source code for the units (step 510). For example, consider that a user indicates that a first unit is dependent on a second unit. The system adds an annotation to the first unit's source code indicating that first unit is dependent on the second unit (e.g., an annotation including the second unit's name).

Figure 6A:
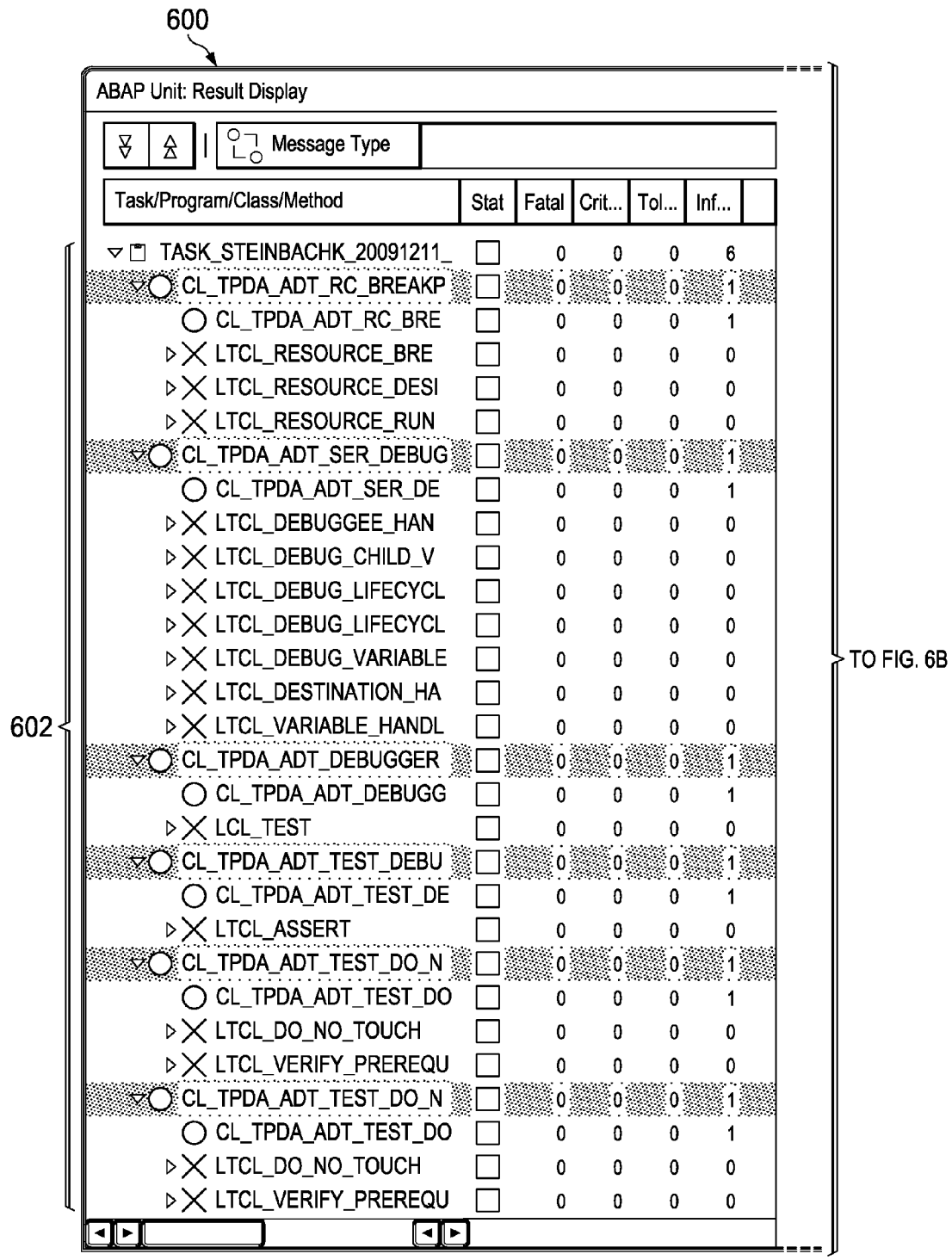
FIGS. 6A-B show a screen-shot that illustrates an example GUI for displaying results of unit testing.
Figure 6B:
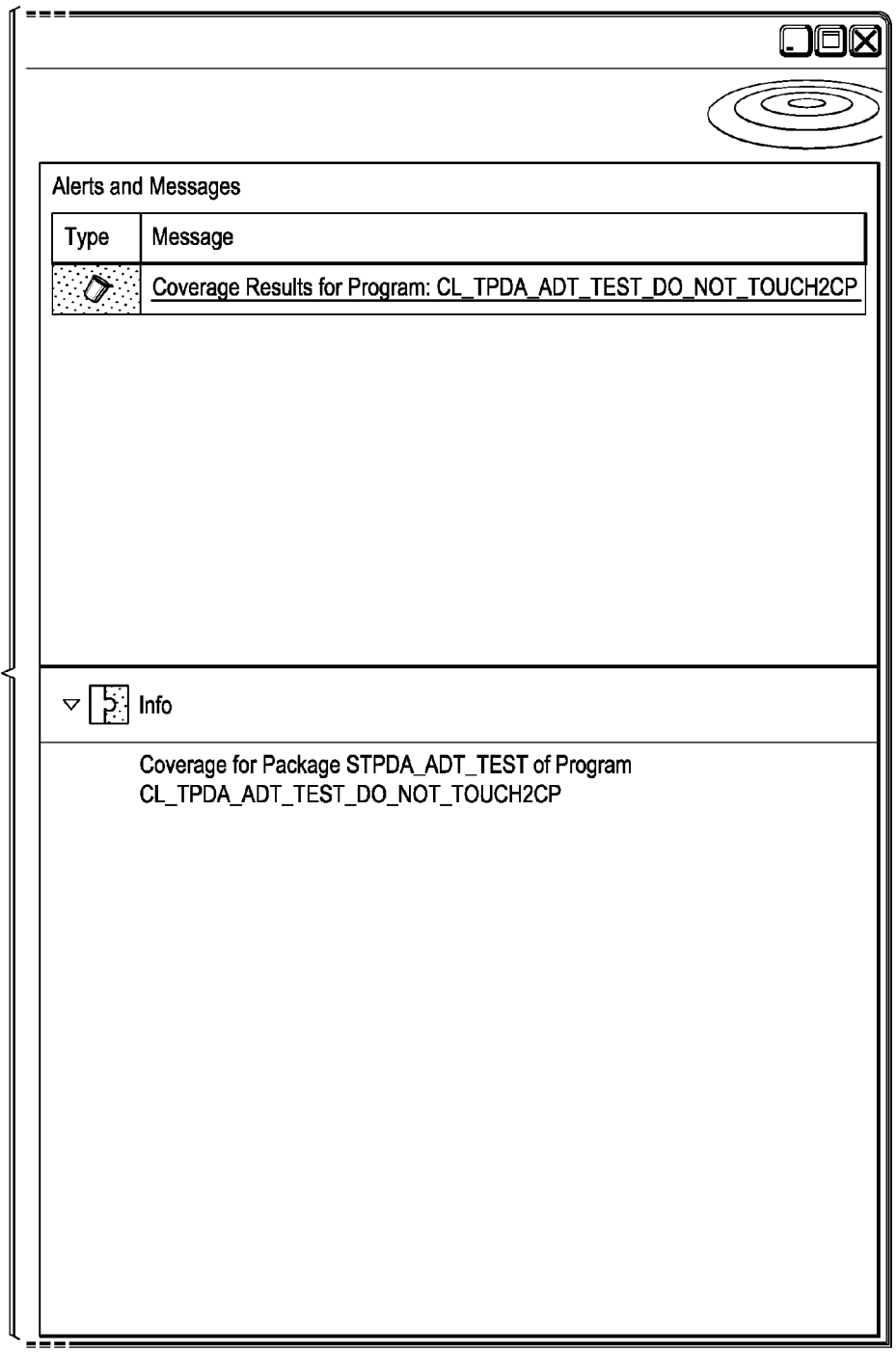

FIGS. 6A-B show a screen-shot 600 that illustrates an example GUI for displaying results of unit testing. A table 602 shows units as columns. Some units are nested beneath other units, for example, where methods are nested under packages that include those methods. The table 602 shows results of unit testing for each unit in the rows for each column. For example, a row can show an indicator summarizing the result of testing a unit (e.g., green for success, red for failure, and so on). The screen-shot 600 illustrates an example scenario where the units shown have all executed without errors.

Figure 7B:
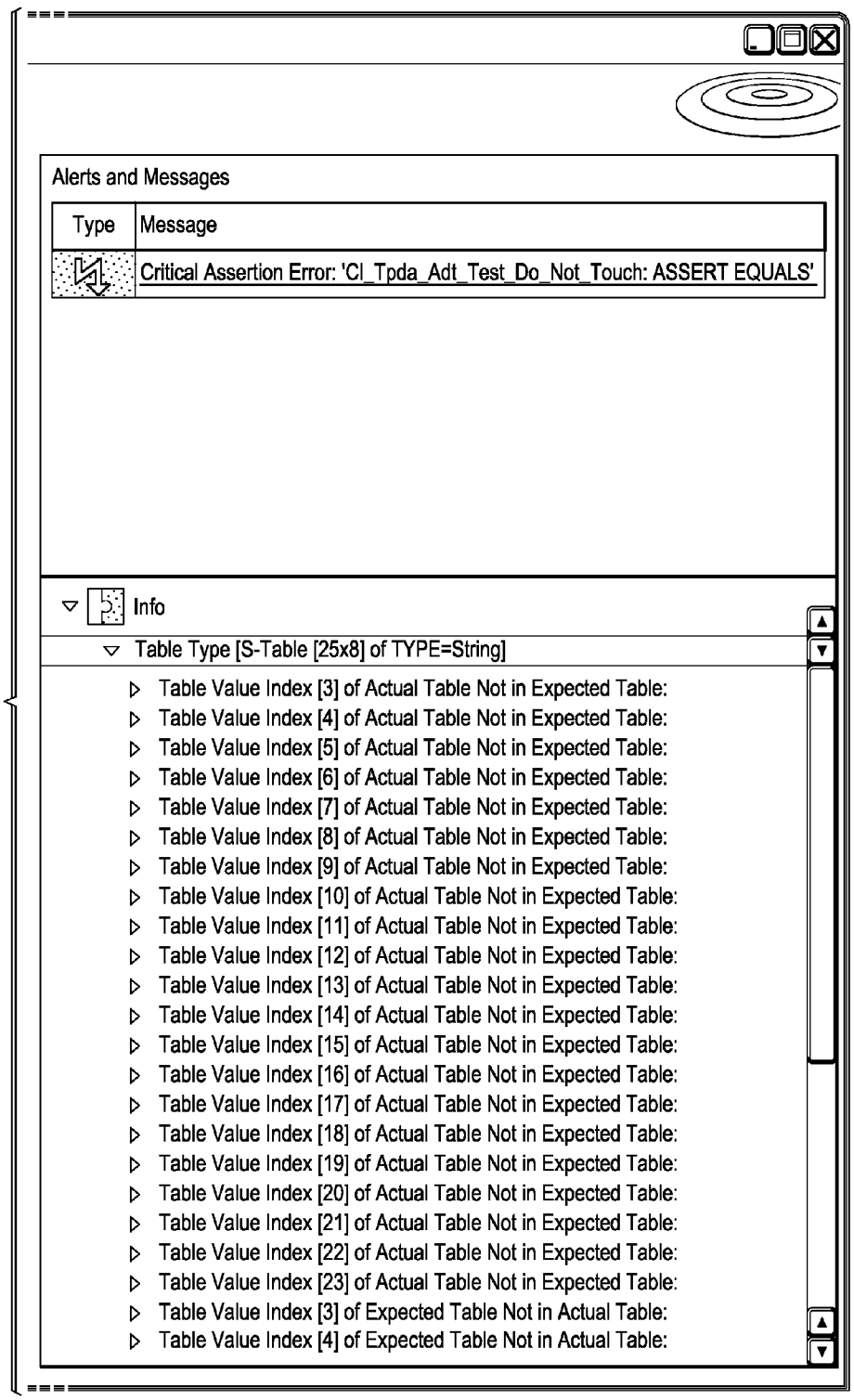

FIGS. 7A-B show a screen-shot 700 that illustrates an example GUI for displaying results of unit testing. The screen-shot 700 illustrates an example scenario where the some of the unit tests have resulted in errors. A developer observing this display of results cannot quickly determine whether each of these units has an independent problem or whether many of the units depend on a single unit with a problem.

Figure 8B:
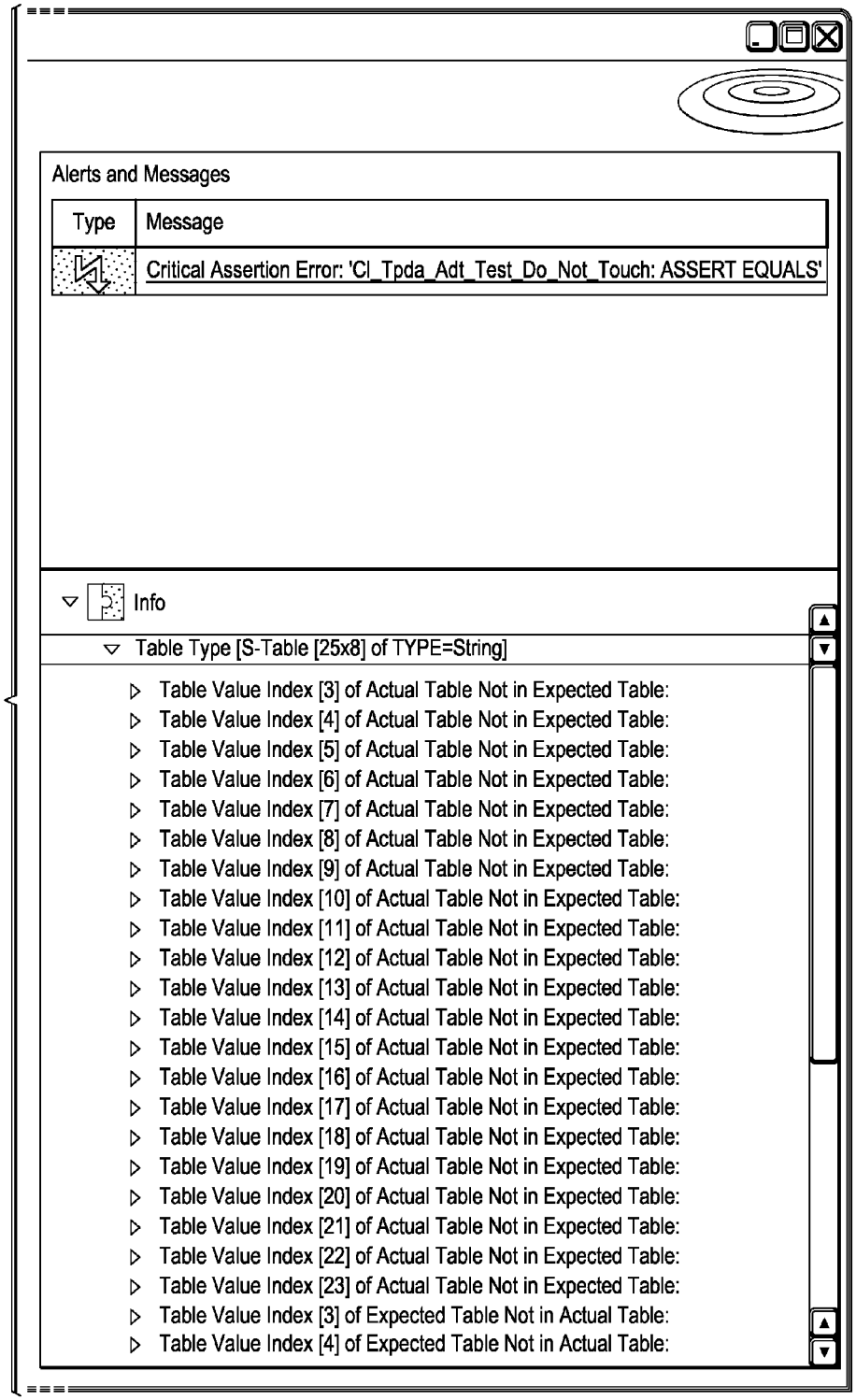

FIGS. 8 A-B show a screen-shot 800 that illustrates an example GUI for displaying results of unit testing. The screen-shot 800 illustrates an example scenario where the some of the unit tests have resulted in errors. However, in this example scenario, some of the unit tests were not performed, for example, because those units were dependent on other units having errors, or because those units were annotated with prerequisites that were not met. Units that were not tested are marked with an indicator (e.g., a yellow colored box).

By not performing certain unit tests, unit testing the application is performed faster. Moreover, a developer who is new to the application can quickly see which unit tests depend on which other unit tests, and where unit test failures drive other unit test failures.

Figure 9:
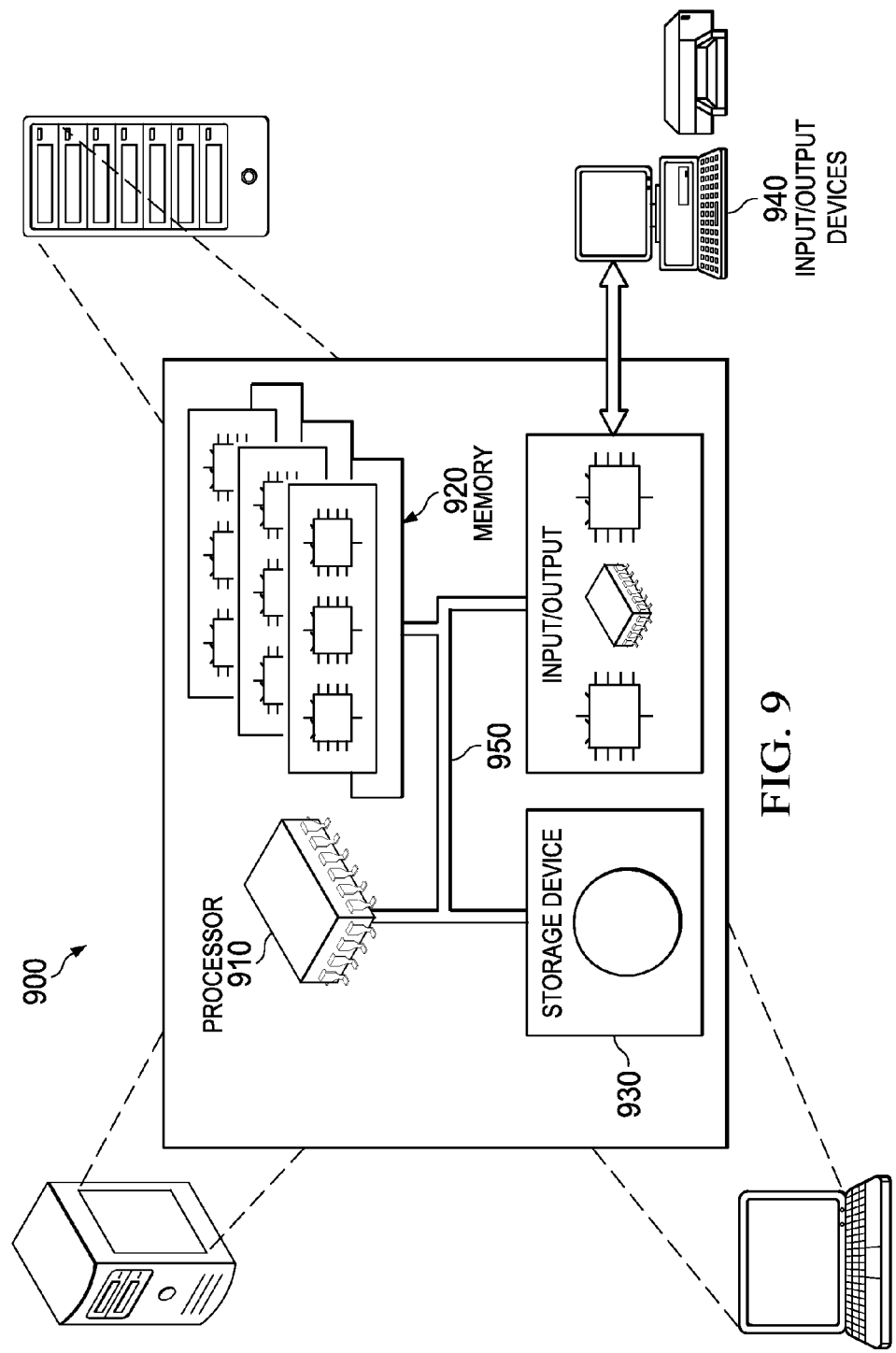
FIG. 9 is a schematic illustration of example hardware components that can be used to execute implementations of the present disclosure.

FIG. 9 is a schematic illustration of example hardware components 900 that can be used to execute implementations of the present disclosure. The system 900 can be used for the operations described in association with the methods described in accordance with implementations of the present disclosure. For example, the system 900 may be included in the application server 102. The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In some implementations, the processor 910 is a single-threaded processor. In some implementations, the processor 910 is a multi-threaded processor. The processor 910 is capable of processing instructions stored in the memory 920 or on the storage device 930 to display graphical information for a user interface on the input/output device 940.

The memory 920 stores information within the system 900. In some implementations, the memory 920 is a computer-readable medium. In some implementations, the memory 920 is a volatile memory unit. In some implementations, the memory 920 is a non-volatile memory unit. The storage device 930 is capable of providing mass storage for the system 900. In some implementations, the storage device 930 is a computer-readable medium. In various implementations, the storage device 930 may be a floppy disk device, a hard disk device, an optical disk device, or a tape device. The input/output device 940 provides input/output operations for the system 900. In some implementations, the input/output device 940 includes a keyboard and/or pointing device. In some implementations, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A method performed by one or more computers, the method comprising:
   identifying a plurality of units of a software application, each of the plurality of units comprising source code;
   parsing each of the plurality of units to identify one or more annotations that are inserted into the source code of the respective unit, the one or more annotations specifying one or more parameters for executing a unit test for the respective unit;
   generating a dependency graph for the plurality of units of the software application from dependencies specified in the identified annotations of each unit of the plurality of units of the software application, the dependency graph specifying dependencies between the units of the plurality of units, wherein a specified dependency between a first unit and a second unit of the plurality of units is such that the second unit depends on the first unit, the first and second units comprising one or more executable instructions;
   determining an initial execution order for the plurality of units from the dependencies specified by the dependency graph;
   receiving user input indicating an update to the initial execution order to provide an updated execution order for the plurality of units;
   based on the user input, generating an additional annotation that indicates that the dependency between the first unit and the second unit is altered such that the first unit depends on the second unit, the first unit calling the second unit;
   inserting the additional annotation into the source code of the first unit;
   and executing, based on the one or more parameters of the one or more annotations, unit tests for the units according to the execution order, executing a unit test of the second unit before the first unit.

2. The method of claim 1, wherein parsing each of the plurality of units to identify the one or more annotations comprises identifying a particular annotation specifying that the first unit depends on the second unit.

3. The method of claim 2, wherein the particular annotation identifies a user-defined dependency.

4. The method of claim 1, further comprising determining that a third unit and a fourth unit of the plurality of units should not be tested in parallel, and wherein the initial execution order specifies that the third unit and the fourth unit should not be tested in parallel.

5. The method of claim 4, wherein parsing each of the plurality of units to identify the one or more annotations further comprises identifying another annotation specifying that the third unit and the fourth unit should not be tested in parallel.

6. The method of claim 4, wherein parsing each of the plurality of units to identify the one or more annotations further comprises identifying another annotation specifying that the third unit is incomplete, and wherein executing unit tests for the units comprises not executing a unit test for the third unit.

7. The method of claim 1, wherein executing unit tests comprises determining a unit testing error for a third unit and determining, using the dependency graph, not to execute unit tests for any units depending on the third unit.

8. The method of claim 1, wherein executing unit tests comprises determining a unit testing error for a third unit and determining, using the dependency graph, not to execute unit tests for any units specified by a further annotation as depending on the third unit having a degree of dependency greater than a threshold.

9. The method of claim 1, displaying a visual representation of the dependency graph.

10. The method of claim 9, further comprising receiving user input to modify the dependency graph;
modifying the dependency graph according to the user input, resulting in a modified dependency graph;
and writing a further annotation to source code according to the modified dependency graph.

11. A non-transitory computer-readable storage medium coupled to one or more processors and having instructions stored thereon which, when executed by the one or more processors, cause the one or more processors to perform operations comprising:
identifying a plurality of units of a software application, each of the plurality of units comprising source code;
parsing each of the plurality of units to identify one or more annotations that are inserted into the source code of the respective unit, the one or more annotations specifying one or more parameters for executing a unit test for the respective unit;
generating a dependency graph for the plurality of units of the software application from dependencies specified in the identified annotations of each unit of the plurality of units of the software application, the dependency graph specifying dependencies between the units of the plurality of units, wherein a specified dependency between a first unit and a second unit of the plurality of units is such that the second unit depends on the first unit, the first and second units comprising one or more executable instructions;
determining an initial execution order for the plurality of units from the dependencies specified by the dependency graph;
receiving user input indicating an update to the initial execution order to provide an updated execution order for the plurality of units;
based on the user input, generating an additional annotation that indicates that the dependency between the first unit and the second unit is altered such that the first unit depends on the second unit, the first unit calling the second unit;
inserting the additional annotation into the source code of the first unit;
and executing, based on the one or more parameters of the one or more annotations, unit tests for the units according to the execution order, executing a unit test of the second unit before the first unit.

12. The computer-readable storage medium of claim 11, wherein parsing each of the plurality of units to identify the one or more annotations comprises identifying a particular annotation specifying that the first unit depends on the second unit.

13. The computer-readable storage medium of claim 12, wherein the particular annotation identifies a user-defined dependency.

14. The computer-readable storage medium of claim 11, further comprising determining that a third unit and a fourth unit of the plurality of units should not be tested in parallel, and wherein the initial execution order specifies that the third unit and the fourth unit should not be tested in parallel.

15. The computer-readable storage medium of claim 14, wherein parsing each of the plurality of units to identify the one or more annotations further comprises identifying another annotation specifying that the third unit and the fourth unit should not be tested in parallel.

16. The computer-readable storage medium of claim 14, wherein parsing each of the plurality of units to identify the one or more annotations further comprises identifying another annotation specifying that the third unit is incomplete, and wherein executing unit tests for the units comprises not executing a unit test for the third unit.

17. The computer-readable storage medium of claim 11, wherein executing unit tests comprises determining a unit testing error for a third unit and determining, using the dependency graph, not to execute unit tests for any units depending on the third unit.

18. The computer-readable storage medium of claim 11, wherein executing unit tests comprises determining a unit testing error for a third unit and determining, using the dependency graph, not to execute unit tests for any units specified by a further annotation as depending on the third unit having a degree of dependency greater than a threshold.

19. The computer-readable storage medium of claim 11, displaying a visual representation of the dependency graph.

20. The computer-readable storage medium of claim 19, further comprising receiving user input to modify the dependency graph;
modifying the dependency graph according to the user input, resulting in a modified dependency graph;
and writing a further annotation to source code according to the modified dependency graph.

21. A system comprising one or more computers configured to perform operations comprising:
identifying a plurality of units of a software application, each of the plurality of units comprising source code;
parsing each of the plurality of units to identify one or more annotations that are inserted into the source code of the respective unit, the one or more annotations specifying one or more parameters for executing a unit test for the respective unit;
generating a dependency graph for the plurality of units of the software application from dependencies specified in the identified annotations of each unit of the plurality of units of the software application, the dependency graph specifying dependencies between the units of the plurality of units, wherein a specified dependency between a first unit and a second unit of the plurality of units is such that the second unit depends on the first unit, the first and second units comprising one or more executable instructions;

determining an initial execution order for the plurality of units from the dependencies specified by the dependency graph;

receiving user input indicating an update to the initial execution order to provide an updated execution order for the plurality of units;

based on the user input, generating an additional annotation that indicates that the dependency between the first unit and the second unit is altered such that the first unit depends on the second unit, the first unit calling the second unit;

inserting the additional annotation into the source code of the first unit;

and executing, based on the one or more parameters of the one or more annotations, unit tests for the units according to the execution order, executing a unit test of the second unit before the first unit.

* * * * *